United States Patent
Joshi et al.

(10) Patent No.: US 7,243,306 B1
(45) Date of Patent: Jul. 10, 2007

(54) SERVICE DESCRIPTOR FOR A MULTITIER COMPUTE INFRASTRUCTURE

(75) Inventors: Shashank Joshi, San Jose, CA (US); Umesh Bellur, Sunnyvale, CA (US); Yan Or, San Ramon, CA (US); Krishna Garimella, San Jose, CA (US); Vinu Sundaresan, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/366,958

(22) Filed: Feb. 13, 2003

Related U.S. Application Data

(60) Provisional application No. 60/396,666, filed on Jul. 17, 2002.

(51) Int. Cl.
*G06F 17/00* (2006.01)
*G06F 17/30* (2006.01)
*G06F 9/44* (2006.01)
*G06F 3/00* (2006.01)

(52) U.S. Cl. .......................... 715/735; 717/120; 707/1; 715/853

(58) Field of Classification Search ..................... None
See application file for complete search history.

(56) References Cited

U.S. PATENT DOCUMENTS

| | | | |
|---|---|---|---|
| 4,558,413 A | 12/1985 | Schmidt et al. | |
| 4,951,192 A | 8/1990 | Chase, Jr. et al. | |
| 5,724,556 A | 3/1998 | Souder et al. | |
| 5,867,714 A | 2/1999 | Todd et al. | |
| 5,889,520 A * | 3/1999 | Glaser | 715/853 |
| 5,930,795 A * | 7/1999 | Chen et al. | 707/100 |
| 6,085,198 A | 7/2000 | Skinner et al. | |
| 6,202,207 B1 | 3/2001 | Donohue | |
| 6,405,251 B1 | 6/2002 | Bullard et al. | |
| 6,411,956 B1 | 6/2002 | Ng | |
| 6,425,126 B1 | 7/2002 | Branson et al. | |
| 6,539,425 B1 | 3/2003 | Stevens et al. | |
| 6,574,635 B2 | 6/2003 | Stauber et al. | |
| 6,718,535 B1 * | 4/2004 | Underwood | 717/101 |
| 2001/0047251 A1 | 11/2001 | Kemp | |
| 2002/0069163 A1 | 6/2002 | Gilbert | |
| 2002/0092004 A1* | 7/2002 | Lee et al. | 717/140 |

(Continued)

OTHER PUBLICATIONS

U.S. Patent Application entitled "Topology Mapping of a Multitier Compute Infrastructure", U.S. Appl. No. 10/365,185, filed Feb. 11, 2003, by inventors Y. Or, J. Casier, K. Garimella, U. Bellur, J. Koper, S. Joshi, G. Chandler and V. Sundaresan.

(Continued)

*Primary Examiner*—Antony Nguyen-Ba
(74) *Attorney, Agent, or Firm*—David W. Victor; Konrad Raynes & Victor LLP

(57) ABSTRACT

A descriptor for a multitier compute infrastructure is provided. A multitier topology map contains an inventory of network tier, application tier, and compute tier components and the relationships among the components. A business service can be defined as a logical grouping of components that transactionally implement a business process. A service descriptor includes the component dependencies that define the business service. The business service leverages the component dependencies to provide cross-tier visibility of the business process and performance analysis features.

21 Claims, 9 Drawing Sheets

U.S. PATENT DOCUMENTS

2002/0174059 A1* 11/2002 Guo ............................ 705/37
2003/0018963 A1* 1/2003 Ashworth et al. .......... 717/175

OTHER PUBLICATIONS

U.S. Patent Application entitled "Business Service for a Multitier Compute Infrastructure", U.S. Appl. No. 10/366,817, filed Feb. 13, 2003, by inventors S. Joshi, U. Bellur, Y. Or, J. Koper and V. Sundaresan.

U.S. Patent Application entitled "Automated Discovery of a Multitier Compute Infrastructure", U.S. Appl. No. 10/391,124, filed Mar. 17, 2003, by inventors Y. Or, J. Casier, K. Garimella, U. Bellur, J. Koper, S. Joshi, G. Chandler and V. Sundaresan.

U.S. Patent Application entitled "Deployment of Applications in a Multitier Compute Infrastructure", U.S. Appl. No. 10/379,617, filed Mar. 4, 2003, by inventors Y. Or, J. Casier, K. Garimella, U. Bellur, and J. Koper.

Oppenheimer, David. The importance of understanding distributed system configuration. System Administrators are Users, Too: Designing Workspaces for Managing Internet-Scale Systems CHI 2003 (Conference on Human Factors in Computing Systems) workshop, Apr. 2003. 3 pages.

PCT/US03/21702, Not Yet Published, PCT International Search Report dated Oct. 23, 2003.

* cited by examiner

SERVICE DESCRIPTOR FOR A MULTITIER COMPUTE INFRASTRUCTURE

RELATED APPLICATION

This application is related to U.S. provisional patent application Ser. No. 60/396,666, filed on Jul. 17, 2002, entitled "Operational Automation Platform for Component Architectures," from which priority is claimed under 35 U.S.C. § 119(e) and which application is incorporated by reference herein in its entirety.

TECHNICAL FIELD

This invention relates generally to distributed computing, and more particularly, to defining logical groupings of distributed components with a service descriptor.

BACKGROUND

With advances in computing, networking and software technology, an increasing number of applications are implemented in distributed environments, often composed of multitier compute infrastructures. For example, many Internet applications are implemented on a compute infrastructure that can be divided into three tiers: network, compute, and application. One advantage of a multitier compute infrastructure is that different tiers can function at different "levels" while still interoperating with each other. In the three-tier example, the network tier operates at the "lowest" level of the infrastructure, the compute tier operates on top of that, and the application tier operates at the "highest" level. As a result, enterprise and other applications can be distributed among the tiers in a fashion that results in greater optimization and utilization of the infrastructure. For example, if a certain functionality is desired, it is not required that the functionality be implemented in a monolithic piece of software installed on a particular computer in a specific location within the network. Rather, the overall functionality can be distributed among different components within the multitier compute infrastructure.

Software component architectures such as Java 2, Enterprise Edition (J2EE™) and .NET are one approach which takes advantage of this flexibility. (J2EE is a trademark of Sun Microsystems, Inc.) Software functionality is divided among different software components, each of which can run on a different host located at a different network address. Each of the software components, computers and the network topology may be optimized for efficiency, security, scalability, or other factors. For example, in the monolithic approach, a single code base and a single computer may be called upon to handle user requests for enhanced images, retrieve raw images from a large image warehouse, and perform complex calculations to enhance the images. With the component approach, one software component and server could handle user requests, another retrieve images, and a third could perform the calculation. The overall enterprise is also more salable since incremental capacity can be added by adding more instances of software components or servers.

One drawback of the multitier and software component approaches is that, typically, many components are used in order to implement the desired functionality. For example, the software portion can be implemented by a large number of software components, each possibly executing on a different server, with the multiple servers located on different networks. Software components may not even be executing on the same server each time. The real-time execution load can be load balanced among a server farm, for example. Currently, it is not uncommon for an enterprise application to have thousands of components, many of which must work simultaneously with each other in order for the overall enterprise application to function properly. In addition, multiple relationships between components exist within each tier, as well as across tiers of the compute infrastructure. For example, in the application tier, a web server and application server might work together to handle user requests. Cross-tier relationships can be more complex, such as those linking the web server, DNS server and access router with each other, but these often are the relationships that have a direct bearing on the availability, performance and security of the overall application.

Due to this increased complexity, managing a multitier compute infrastructure is more difficult. Typical management tools are mostly limited to a single tier. Many of these tools were developed for system administrators who are responsible only for a single tier. That is, one system administrator is responsible for networking, another for computers, and another for software loaded on the computers. Single-tier tools can give some visibility into the tier for which the system administrator is responsible, but do not give visibility into cross-tier relationships or interactions.

Single-tier tools also do not give direct visibility into the service which is a business' end goal. For example, in the image enhancement example, the business is really interested in the delivery of enhanced images, not in the congestion level of its internal routers or the state of its internal network. The router and network are of interest only to the extent that they impact the business service of delivering enhanced images but, with single-tier tools, it is difficult, if not impossible, to determine this relationship. As a result, the relationship typically must be manually pieced together, one tier at a time, and often using knowledge that resides only in some key employee's head. This is both time-consuming and risky—for example, if the key employee were to be unavailable.

Additionally, a lack of knowledge or incorrect knowledge about a cross-tier relationship can make the business impact of an outage unknown. For example, if an application server requires an upgrade to fix a potential security problem, the complexity of the cross-tier relationship may make it difficult to know which businesses processes could be directly or indirectly affected by the application server downtime. Similarly, the scope of the potential security problem could be unknown as well.

Other approaches attempt to address these shortcomings, yet lack visibility into enterprise-wide performance management analytics or business metrics. Much effort is being spent on approaches based on monitoring. OPENVIEW™ and TIVOLI® are examples of efforts in this general direction. (OPENVIEW is a trademark of Hewlett-Packard Company and TIVOLI is a registered trademark of International Business Machines Corp.) Management tools can monitor individual components in the infrastructure through instrumentation with increasing detail and sophistication. This can give improved visibility into the individual component but does not effectively address cross-tier visibility or the relationship between a component and a business service. For example, processor throughput, server availability and similar metrics at best can only give indirect visibility into business services, for example whether customers have access to an enterprise application and can perform promised tasks at published service levels.

What is therefore needed is a logical grouping of distributed components that: (1) provides visibility of cross-tier interactions; (2) provides metrics or performance analysis of a business process; and (3) provides a grouping of logical applications or sub-parts of logical applications to a business service.

SUMMARY OF THE INVENTION

A business service specifies a logical grouping of components that collectively perform a business process. A multitier topology map includes an inventory of application, compute, and network tier resources available across an enterprise. The multitier topology map also includes information about how the resources are related to each other. For example, the multitier topology map can capture a relationship between an application and a database that provides backend data storage for the application. An inventory of the resources and the corresponding relationships among those resources, however, does not define how the resources of the infrastructure work together to perform a business process. The overall business process could be composed of many separate transactions that are implemented by different applications. The business service groups these applications together in a way that is meaningful for understanding the business process as a whole.

One embodiment of the present invention provides a business service that logically groups the resources that accomplish a business process. A set of candidate components is obtained from the multitier topology map. Candidate components include resources, such as application components, that can compose a business process. The business service is formed by selecting the candidate components that implement the business process. For example, a business may have an ordering process that relies upon several pieces of the multitier compute infrastructure. An ordering business service can be defined to include each of the components, such as an order processing application, an inventory application, and a billing application.

The business service can be used to create a service-level view of the multitier compute infrastructure. A service-level view incorporates the dependency information from the multitier topology map to illustrate the application, compute, or network resources that implement the business process. The service-level view, therefore, can provide cross-tier visibility into the functioning of the business process.

In another embodiment of the present invention, a method for defining a business service is provided. The method generally receives input data for describing a service access point, builds a business service object using the service access point; and integrates the business service object into the multitier topology map. The service access point can be manually specified by a user or automatically determined. In one approach, the multitier topology map is queried for groups of dependencies. These groups of dependencies are analyzed for transactional chains. The transactional chains can be further analyzed to determine a set of candidate service access points and a group of components that accomplish a business process.

In a further embodiment of the present invention, a descriptor is provided to identify component-level dependencies. The descriptor can indicate how an application component maps to a particular business service. That is, the descriptor can indicate how an application component works with other pieces of the multitier compute infrastructure to accomplish a higher-level business process. The dependency information in the descriptor can be programmatically generated and queried and is useful for building a business service object that can be integrated in the multitier topology map.

In another embodiment of the present invention, the business service can provide precise metrics or performance analysis for the business process. Performance data can be gathered for each of the components of the relationship and analyzed for the business service. Other abstractions, such as logical applications can make it more convenient to define the business service without losing the fine component granularities available in the multitier topology map.

Further features of the invention, its nature and various advantages will be more apparent from the accompanying drawings and the following detailed description.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art. Although embodiments of the present invention are described as including discrete steps or modules, one skilled in the art will appreciate that the features or the functionalities of the present invention can be implemented in a variety of ways. For example, aspects of the present invention can be implemented using program instructions executing on a general-purpose computing device, an application-specific computing device, or in hardware (e.g., an integrated circuit). The program instructions can be distributed on a computer readable medium or storage volume. The computer readable storage volume can be available, for example, via a public network, a private network, or the Internet. Program instructions can be in any appropriate form, such as source code, object code, or scripting code.

A. Multitier Topology Map

Figure 1:
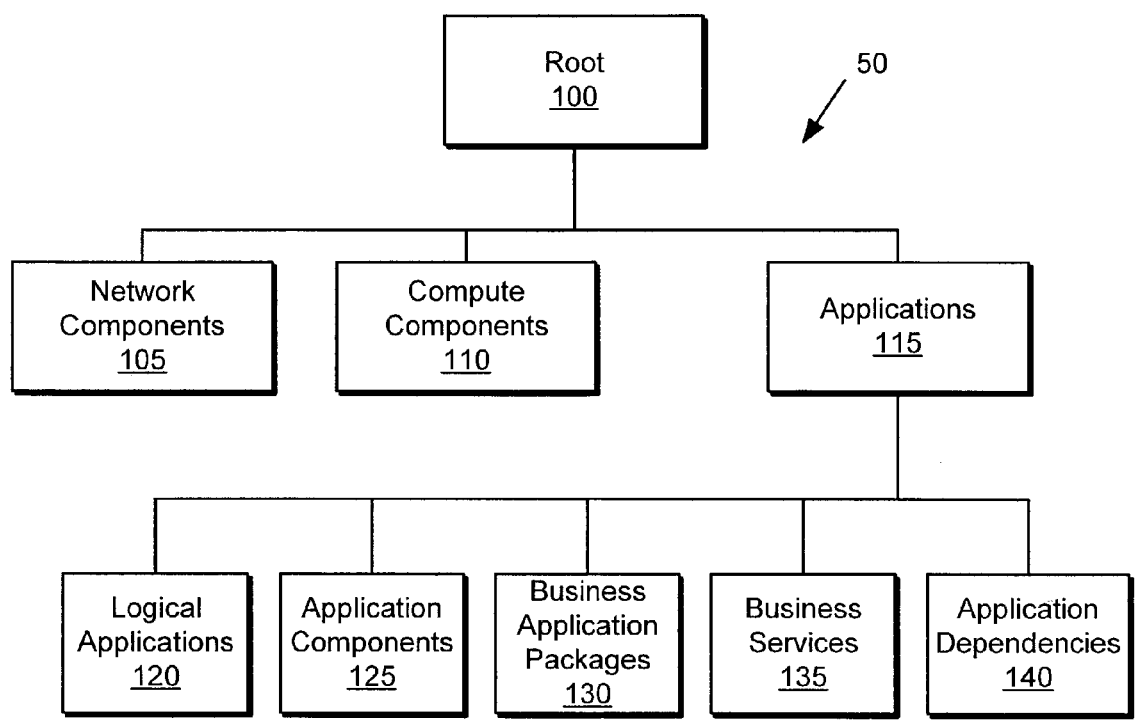
FIG. 1 is a multitier topology map in accordance with the present invention.

FIG. 1 is a multitier topology map 50 in accordance with the present invention. In the illustrated example, the multitier topology map 50 is a data hierarchy that can be used to manage a multitier compute infrastructure. At a general level, a topology map describes the topology of a compute infrastructure. In other words, it identifies components within the infrastructure and indicates relationships between various components. The multitier topology map 50 illustrated in FIG. 1 is multitier in the sense that it identifies components from two or more tiers and at least one of the relationships in the map is a cross-tier relationship. The multitier topology map 50 is useful in managing a distributed computing environment because it documents the topology of the environment. The multitier topology map 50 is especially useful because it provides visibility into cross-tier interactions and relationships. That is, relationships among components of the multitier topology can be discovered, mapped, and stored in a data structure. Higher-level abstractions, such as the business services described below, can be defined to group components logically together and to make use of the component dependency information captured in the multitier topology map 50 as well as be added to it.

The visibility provided by the multitier topology map 50 has many benefits. It can reduce the time required to deploy new applications, as the process of identifying changes and relationships is automated. It can reduce the time required to troubleshoot faults within the infrastructure, as relationships between components are more easily identified. It can reduce the IT head count needed to support the infrastructure, as there is more documentation describing the infrastructure. It can also facilitate greater optimization of the infrastructure, as key relationships in the infrastructure are identified and better understood. As a result, the business typically can reduce its time to implement new deployments, business processes and policy changes. It typically can also enable one to gain a better understanding of the relationship between the multitier compute infrastructure and business goals.

Returning to the exemplary multitier topology map 50 shown in FIG. 1, extending from root 100 are network components 105, compute components 110, and applications 115. The subcategories extending from applications 115 include logical applications 120, application components 125, business application packages 130, business services 135, and application dependencies 140. Each of these categories is described in further detail below.

1. Network Components, Compute Components, and Applications

Network components 105, compute components 110, and applications 115 respectively correspond to the components of a multitier compute infrastructure (e.g., a distributed computing environment) that includes a network tier, compute tier, and application tier. One skilled in the art will recognize that network components 105, compute components 110, and applications 115 are one way of categorizing the functionalities of a multitier compute infrastructure and other categorizations can be used to identify the components and the relationships among the components. The network tier generally includes network components 105, which are items that concern network communications. In a typical Internet case, it might include the access and IP network and network components hosted or implemented on these networks, such as switches, routers, load balancers, firewalls, virtual LANs (VLANs), virtual private networks (VPNs) and layer 4–7 software switches and routers. Example vendors include CISCO Systems, Inc., Unisphere Networks, Inc., Redback Networks, Inc., and NetScreen Technologies, Inc.

The compute tier generally includes compute components 110, which are items that provide underlying system functionality that may be used by many end use applications. Typical technology areas include computing, storage and infrastructure services. Examples of components in the compute tier include host hardware such as desktop computers, servers and processors (e.g., Sun Microsystems, Inc., Intel Corporation, and Hewlett-Packard Development Company, L.P., operating systems (e.g., SOLARIS, LINUX, NT, HP-UX, AIX) (SOLARIS is a registered trademark of Sun Microsystems, Inc., LINUX is a registered trademark of Linus Torvalds, HP-UX is a registered trademark of Hewlett-Packard Dev. Comp., and AIX is a registered trademark of International Business Machines, Corp.), and storage devices including RAID arrays, disk farms, storage area networks and the like (e.g., EMC Corporation, Brocade Communication Systems, Inc.). System services, such as DNS, LDAP, and NFS, are also classified as part of the compute tier in this example.

The application tier generally includes applications 115, which are software that is more directed to providing end user or enterprise functionality, as opposed to system services for example. Example components include web servers, e.g., (APACHE, IPLANET, IIS) (APACHE is a trademark of The Apache Software Foundation and IPLANET is a trademark of Sun Microsystems, Inc.), application servers (e.g., J2EE, non-J2EE, WEBLOGIC, WEBSPHERE, IPLANET, ATG, COM+, .NET) (WEBLOGIC is a trademark of BEA Systems, Inc., WEBSPHERE is a registered trademark of International Business Machine Corp., ATG is a registered trademark of Art Technology Group, Inc., and .NET is a trademark of Microsoft Corp.), packaged applications (e.g., PEOPLESOFT, SIEBEL) (PEOPLESOFT and SIEBEL are registered trademarks of Oracle Corp.), legacy software, and database software (e.g., ORACLE) (ORACLE is a registered trademark of Oracle Corp.). Applicants 115 define a broad category of functionality including subcategories of logical applications 120, application components 125, business application packages 130, business services 135, and application dependencies 140.

2. Logical Applications and Business Services

In one embodiment of the present invention, logical applications 120 are defined as a grouping of application components 125 and business application packages 130. In the data hierarchy of FIG. 1, logical applications 120 are illustrated at the same level as application components 125 and business application packages 130. Although illustrated at the same level within the context of the topology map, logical applications 120 define higher-level functional behavior. For example, a logical application, such as order entry, can be defined to include a business application package (e.g., a database) and a web server. Although business application packages 130 can include application components 125, logical applications 120 can directly include application components 125 as members. This flexibility in definition enables fine granularity over the composition of logical applications 120. The abstraction provided by logical applications 120 has several advantages. In some enterprises, for example, applications are implemented at the workgroup or department level. Defining a logical application (e.g., order entry) can require components from several departments. Logical applications 120 can relate application components 125 and business application packages 130 across departments to define a higher-level functional object. For example, an order entry logical application can include a business application package from the accounting department and an application component, such as an inventory stock-on-hand module from the shipping department.

Further, logical applications 120 inherit each of the dependencies of the member components. By using a logical application abstraction, the topology of the underlying member components can be changed without affecting the definition of the logical application. Given that logical applications 120 can include pieces of functionality from distinct departments or workgroups within the enterprise, changes at the application component-level, for example, are likely. Dependencies and cross-tier interactions are described in further detail below and with reference to FIG. 2.

Application components 125 are software components that implement some functionality and are generally coupled together to form an application. One example of application components 125 is Enterprise Java Beans (EJBs). Business application packages 130 can be groupings of application components 125 or other applications, such as databases. Business application packages 130 also support the formation of hierarchies. For example, an enterprise application implemented using the J2EE software component architecture might consist of a number of Enterprise Java beans (EJBs), each possibly executing on different hardware. In one classification, each EJB is a separate application component and the overall enterprise application is defined as a business application package that includes the collection of EJBs. Application components 125 and business application packages 130 both can be subcomponents of a logical application.

As another example, the accounting function within a business may rely on many different pieces of software, each of which is defined as an application component. It can be useful to define a business application package "Accounting" that includes these different pieces of software. This has several advantages. For example, it gives visibility into which parts of the multitier compute infrastructure are affected by the accounting department, and also how the accounting department might be affected by changes in the multitier compute infrastructure. Again, component memberships and granularity are not fixed. For example, a business application package "Accounts Receivable" might be defined in addition to or instead of the Accounting business application package. The Accounting business application package can be defined as including the Accounts Receivable business application package. Other variations will be apparent.

Business services 135 are logically similar to logical applications 120 but are qualitatively different. They are similar in the sense that a business service also supports the formation of hierarchies, in much the same way that logical applications 120 do. Both provide higher levels of abstraction. However, as used in this example, business services 135 provide a business centric window into the multitier compute infrastructure. They provide visibility into functions that are directly relevant to the business operation—for example, order placement, status, and tracking, serving web pages, billing inquires, and/or meeting service level commitments. In contrast, logical applications 120, while they also represent higher-level functionality, are more concerned with how functionality is packaged and deployed. For example, customers typically are concerned with order placement (a business service) but not with how the service is implemented which may be using multiple business application packages.

Business services 135 offer the business throughput data that are used to understand the revenue, expense and/or customer service performance of the business. In other words, business services 135 define the relationships between the components in the multitier compute infrastructure and the enterprise's actual business. As a result, they can provide visibility into questions such as the following. If order placement is not operating correctly, which components might be the cause? If certain components in the infrastructure are to be taken offline, what business services will be affected—order placement, web page serving, availability of certain services, other? If a business service is too slow, where is the bottleneck and why? Because of their importance and high level of abstraction, business services 135 typically are managed as a first-class entity in the system. That is, performance data or metrics can be collected from the member components and aggregated or analyzed to generate a performance analysis for the business process. One skilled in the art will appreciate an end-user response time measurement at a component granularly, for example, can be performed using the infrastructure of the multitier topology map 50.

As an example of performance analysis, an ordering service might include two transactions: one to actually place the order for a product and one to check on the status of the fulfillment of that order. The first transaction involves a web server, a B2B server that connects with a credit card company, an application server that holds the business logic for processing the order and a backend database, in addition to other network resources. The second transaction involves an overlapping set of components. In a traditional IT management structure, a network administrator is responsible for the network resources, a systems administrator is responsible for the various servers, and an applications administrator is responsible for deploying, shutting down and restarting these applications. However, none of these views gives significant visibility into the ordering service itself. The business management staff (e.g., the CIO or the CFO) are more interested in the performance of the ordering service (as opposed to any one tier) since ordering is directly linked to the health of the company's revenues for the quarter. A report on the availability rate of an individual server is not particularly interesting. The CIO is more interested in the availability of the ordering service as a whole. To accomplish this task, a business service "Ordering" is defined that includes the relevant components.

In another example, the sales force has a software system for the sales cycle, including order entry. The manufacturing division has separate software for inventory control and yet other software for tracking work in progress on the factory floor. The shipping dock has its own software for logging shipments, and the accounting department has yet another system to track accounts receivable. While each of these areas is interesting in its own right, the business is interested in tracking the progress of ordered products through the entire production process. Therefore, a business service "Order Tracking" is defined to include these different components.

As with logical applications 120, business services 135 can be defined in different ways and at different granularities. In the ordering example, "Order Placement" and "Order Fulfillment" can be defined as two separate business services, and the "Ordering" business service defined in terms of them. As another example, "Order Tracking" can be defined in terms of the application components 125 used to implement accounts receivable. Alternately, it can be defined in terms of an "Accounts Receivable" logical application, which in turn has been defined in terms of application components 125. Note that, similar to logical clusters, logical applications 120 and business services 135 have aspects of both a relationship and a component.

In the example of FIG. 1, logical applications 120 and business services 135 typically are defined in terms of application-level components: typically application components 125, business application packages 130 and business services 135. The definition typically also indicates relationships between the components, either explicitly or by inheritance or implication. In the example of FIG. 1, application components 125 typically are relatively low level components for which relationships with compute components 110, network components 105 and other application components 125 are either explicitly indicated or easily discovered. For example, a web server executing on a particular hardware server on a particular subnet has a dependency on that hardware server and subnet. These types of relationships typically are not repeated in the higher-level definitions of logical applications 120 and business services 135, but are included by inheritance. Thus, a business service "Web Page Serving" can be defined as dependent on the web server and, by implication, also dependent on the hardware server and subnet.

3. Application Relationships and Objects

Application dependency 140 is a relationship between components at the application-level, indicating that one application-level component somehow depends on another application-level component. The term "application-level component" is used here because, in this example, the term likely is not limited to just application components. Two examples of application dependency include transactional dependency and service dependency. Transactional dependency means that in order for application-level component X to service a user request, application-level component Y must be available. For example, X may be a web server responding to requests for data and Y is the corresponding database server. Service dependency is more infrastructure oriented. Service dependency refers to application-level components that are not in the direct path of a user request, but that are still necessary. Examples include components such as DNS, security or session services.

The multitier topology map 50 in FIG. 1 is application-centric. In this case, the categories extending from the root are network components 105, compute components 110 and applications 115. The subcategories extending from applications 115 are logical applications 120, application components 125, business application packages 130, business services 135 and application dependencies 140. Each of these components can be stored as objects in the topology map. One skilled the art will recognize that objects and relationships among objects can be mapped to relational database tables or otherwise stored in a data store. The term "object" is used throughout in its general sense and does not imply implementation using object-oriented programming.

Containment is not defined in separate objects. It is limited primarily to physical relationships, which are defined in the objects for the corresponding components. For example, an object for an application component indicates the hardware server on which it executes, or the object for a hardware server indicates the subnet on which it resides. Logical applications 120 and business services 135 are defined primarily at the application-level, which is why they are classified under "applications" for storage into the topology map. However, lower level dependencies are defined by inheritance.

As with tiers and components, the selection and definition of relationships to be used in the multitier topology map 50 is not unique. Other types of relationships and different definitions for the relationships described above will be apparent. For example, in an alternate implementation, service dependency and transactional dependency can be lumped together in a single category. Or transactional dependency can be defined as, in at least N % of user requests, Y is required. Or the relationships or components can be defined at a different granularity. For example, transactional dependency may mean that servicing a request from web page X requires a certain portion Y of a database, as opposed to web server X requires database Y.

As a further example, logical clustering is an item that has aspects of both a relationship and a component. It supports the formation of hierarchies. For example, execution of software may be load-balanced among hardware servers in a server farm. The logical cluster relationship can be used to define a new component that includes the load balancer and the hardware servers. A containment relationship exists between the software and the logical cluster. The relationship aspect of logical cluster is that it defines a certain relationship between components—the load balancer and hardware servers in this case. The component aspect is that the logical cluster itself is a component and can have relationships with other components. As used in this example, logical clusters are limited to lower level clusters, for example clusters of hardware and/or more infrastructure-related software.

Figure 2:
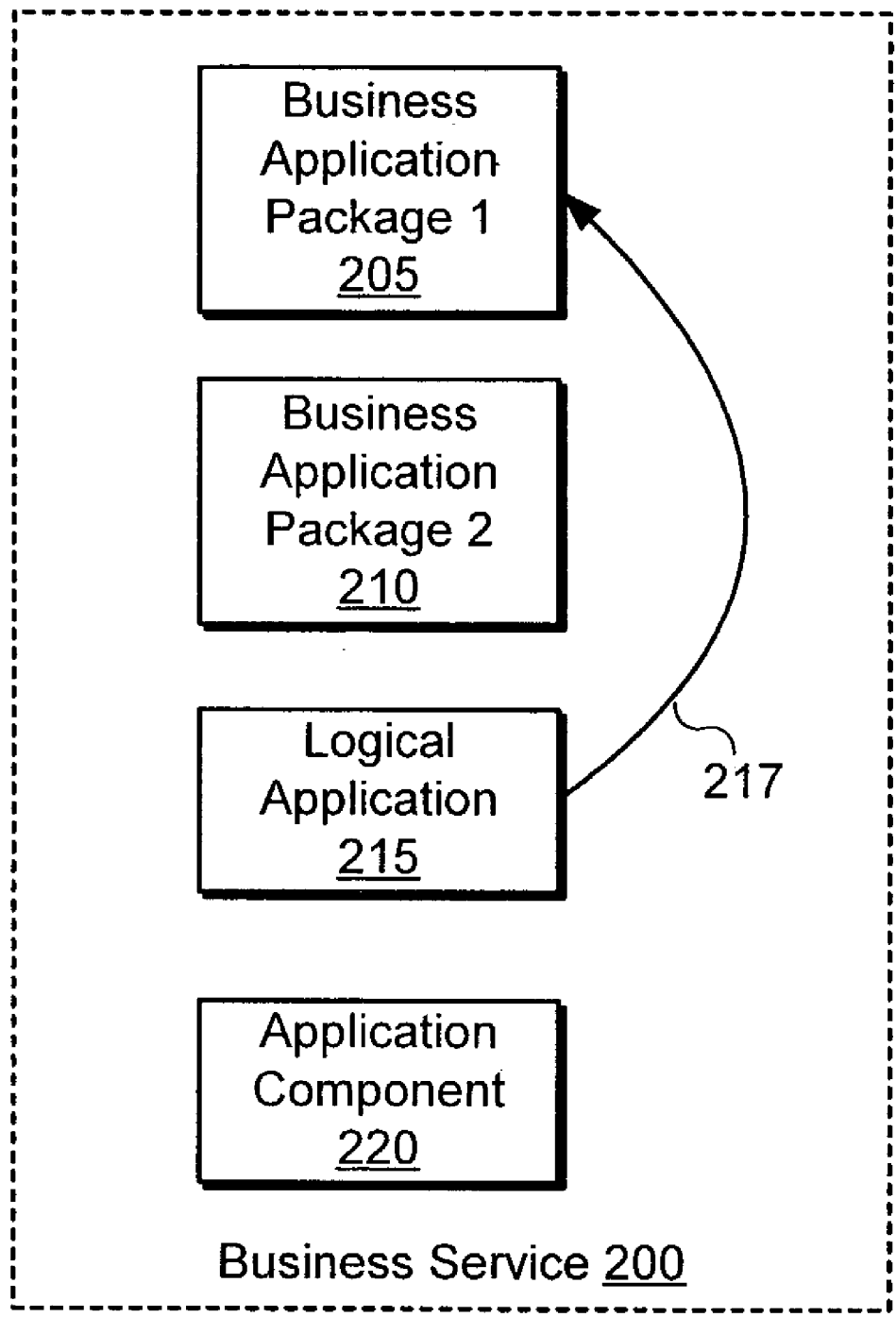
FIG. 2 is an illustration of a business service definition according to one embodiment of the present invention.

FIG. 2 is an illustration of an exemplary business service definition according to one embodiment of the present invention. The illustrated embodiment shows a business service 200 including a first business application package 205, a second business application package 210, a logical application 215, and an application component 220. As described above, the business service 200 can be represented as an object in which components, such as first business application package 205, are members. That is, the first business application package 205 and logical application 215 are components of the higher-level object the business service 200. The business service 200 is flexible as to which components can be included in the membership. For example, logical application 215, second business application package 210, and application component 220 each represent components or groups of components at distinct hierarchical levels. One advantage of providing flexibility in the definition of the business service 200 is that a higher-level object (e.g., the logical application 215) may be over inclusive for accurate definition of the business service 200. The ability to include sub-parts of a logical application or subcomponents of a business application package enables accurate performance analysis and visibility of the cross-tier relationships from the multitier topology map 50 that affect the business service 200.

A relationship 217 is illustrated between first business application package 205 and logical application 215. Relationship 217 indicates that logical application 215 depends on first business application package 205. The dependency could be between an application component that is included in the definition of the logical application 215 and an application component member of first business application package 205. Due to object inherency, the relationship can be resolved down to the finest level of granularity available in the multitier topology map 50. In the illustrated view of business service 200, however, the granularity of the underlying relationship is not specifically illustrated. One skilled in the art will note that although business service objects are high-level abstractions, the components and corresponding relationships included in the multitier topology map 50 enable the business service definition to capture, for example, application component-level cross-tier detail.

One advantage of defining the membership of the business service 200 with higher-level objects, such as logical application 215, is that the business service 200 can be updated as underlying relationships change without redefining the membership of the business service 200 itself. For example, second business application package 210 may be a payroll application that depends on compute host a (not illustrated) to execute the payroll application. If the payroll department decides to move the payroll application to compute host_b, the changed dependency can be reflected in the business service 200 without manual intervention or redefinition of the membership of the business service 200. In one embodiment of the present invention, data in the multitier topology map 50 is updated to reflect the changed compute host for the second business application package 210. Business service 200 is only an example and may include all or none of the types of components illustrated, such as business application packages, logical applications, and application components.

As described in further detail below, a service descriptor can be used to specify component relationships. One type of component relationship is an application component dependency. According to one embodiment of the present invention, the service descriptor contains dependency information for the application components that form a business service. The multitier topology map 50 includes an inventory of application components 125. Typically, the application components 125 can be discovered in a runtime environment. Using the dependency information from the service descriptor, the application components 125 can be logically grouped to form a higher-level abstraction, such as a business service.

One skilled in the art will recognize that business services can be represented as first-class objects and stored in the multitier topology map 50. The architecture of the multitier topology map 50 allows for flexibility when storing the objects. For example, relationship 217 can be stored directly in the object that corresponds to the business service 200 or the relationship 217 can be stored in the object that corresponds to the application dependencies 140.

Figure 3A:
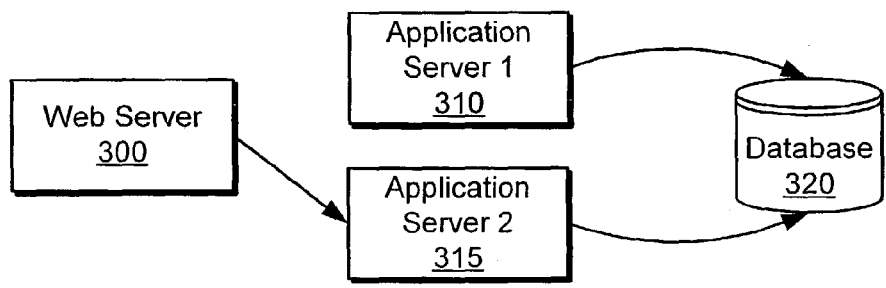
FIG. 3A is a graph view of application tier dependencies for an exemplary enterprise in accordance with the present invention.

FIG. 3A is a graph view of application tier dependencies in accordance with the present invention. In this application-level view, a web server 300 is shown coupled to a second application server 315, which is further coupled to a database 320. Also illustrated is a first application server 310 coupled to the database 320. The illustrated components are coupled based on dependency information obtained from the multitier topology map 50. That is, the web server 300 depends upon second application server 315. The second application server 315 has a dependency relationship with the database 320. The dependency between the web server 300 and the second application server 315 can be inferred from the component dependency information stored in the multitier topology map 50. Because the multitier topology map 50 includes lower-level components (e.g., application components 125), the dependencies illustrated can be generalized from finer granularity information. For example, a dependency among a subcomponent of the web server 300 and a subcomponent of the application server 2 (315) can be generalized as a dependency among the higher-level components or objects.

A system operator may only be interested in a higher-level view of the topology without the underlying dependencies illustrated, such as the view illustrated in FIG. 3A. Embodiments of the present invention, however, also generate lower-level views and component-centric views of the multitier topology to provide cross-tier visibility. Component dependencies can be initially discovered or updated in an automated fashion. Alternatively, component dependencies can be manually defined.

Figure 3B:
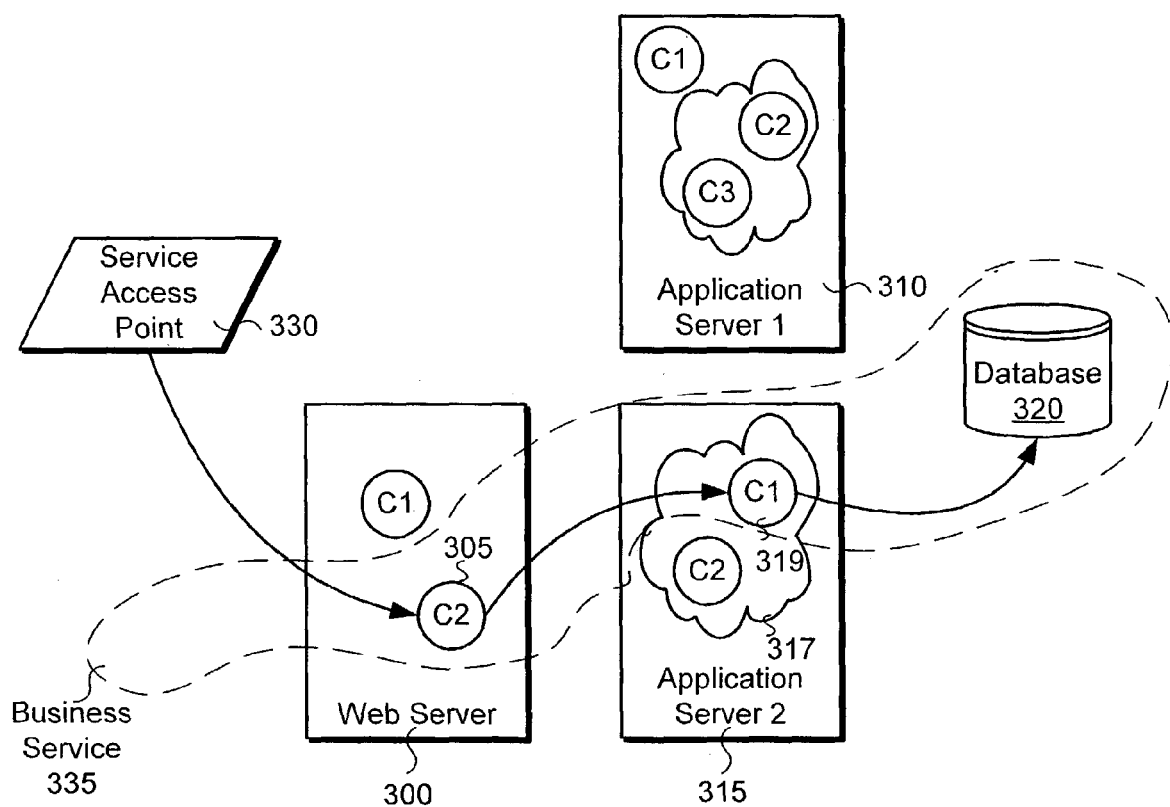
FIG. 3B is a graph view of business service dependencies according to one embodiment of the present invention.

FIG. 3B is a graph view of business service dependencies according to one embodiment of the present invention. As describe above and with reference to FIG. 2, components of various levels within the multitier topology map 50 can be grouped together to form a business service. One benefit of including, for example, compute components 105 in the multitier topology map 50 is the ability to determine which resources are used to provide the business service. A system administrator can then determine the impact of resource availability and performance to the transactional path that implements the business service.

In the illustrated example, the web server 300, the first application server 310, and the second application server 315 are shown in more detail. A business service can be represented as a chain of component dependencies beginning from a service access point 330. The service access point 330 is a uniform resource locator (URL) or other resource identifier, such as the port number of a compute resource. For example, the service access point 330 for an "ordering" business service could be http://ordering.company.com. Another example of the service access point 330 could be a hostname and port number (e.g., webserver.company.com:80). A business service 335 is illustrated as a grouping of components across various pieces of the multitier architecture, such as the web server 200 and the second application server 315. As described above and with reference to FIG. 2, a business service can define the resources used across an enterprise environment at the application component level. One advantage of mapping the business service at this level is to provide precise metrics or performance analysis. Performance data can be gathered for each of the application components and aggregated for the business service. Other abstractions, such as logical applications can make it more convenient to define the business service without losing the fine component granularities available in the multitier topology map 50.

Referring again to FIG. 3B, the business service 335 includes a logical application 305 and an application component 319. Other illustrated components or objects can be determined using the dependencies or object inherencies present in the multitier topology map 50. For example, the second application server 315 includes a business application package 317. The business application package 317 further includes the application component 319 as well as other application components. In the illustrated instance, the business service 335 depends only on application component 319 and not the business application package 317 as a whole. Likewise, application component 319 depends upon the database 320. One skilled in the art will note that because application component 319 depends upon the database 320, the business application package 317 implicitly depends upon the database 320.

The transactional path for the business service 335 includes the following components: from the service access point 330 to logical application 305, the application component 319, and the database 320. One skilled in the art will observe that the logical application 305 represents a component of the web server 300. That is, logical application 305 depends upon the resources of the web server 300, which in turn depends upon compute tier resources (not illustrated). If the web server 300 becomes unavailable, for example, then the business service 335 will likewise become unavailable. A system administrator can, therefore, determine how cross-tier relationships impact the availability, performance, or other metrics of the business service 335.

In embodiments of the present invention, some relationships can be automatically discovered. For example, it can be determined that the web server 300 depends upon the second application server 315 by observing the communications between the two components. For defining the business service 335, however, the automatic discovery methods may not be able to determine which subcomponents of the web server 300 are part of the business service 335. In one embodiment of the present invention, the membership of the business service 335 is defined using a descriptor. Further details of embodiments for defining the membership of a business service are described below. One skilled in the art will appreciate that in an embodiment of the present invention, a business service can be one or more transactions with a single service access point 330. Additionally, a plurality of business services can have the same service access point.

Figure 4:
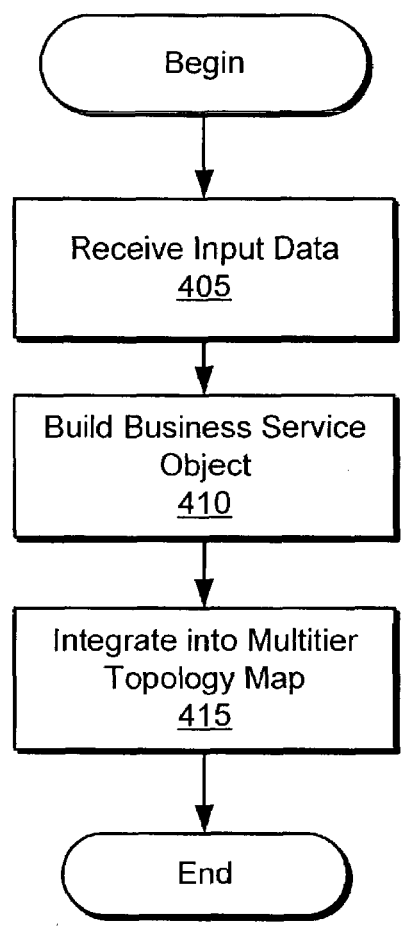
FIG. 4 is a flowchart illustrating a method for defining a business service according to one embodiment of the present invention.

FIG. 4 is a flowchart illustrating a method for defining a business service according to one embodiment of the present invention. A business service can be defined using a descriptor. The descriptor for an application component contains information about the components that the application component depends upon. An example dependency is a first application component that requests data from a second application component. The first application component, therefore, has a dependency on the second application component to provide data.

The illustrated process begins with receiving input data 405. The input data includes a service access point. As described above, the service access point represents a resource identifier for the beginning of chain of dependencies thorough the multitier compute infrastructure. The service access point can be manually entered by the user (via an interactive or non-interactive interface), or automatically determined by "crawling" the multitier topology map 50 for available resources. Further details of determining the service access point are described below and with reference to FIG. 5.

In one embodiment of the present invention, a business service definition can be inferred from the service access point. As described above, the multitier topology map 50 includes dependency information about numerous components of a multitier compute infrastructure. Although relationships among components of the multitier compute infrastructure have been captured in the multitier topology map 50, the service access point identifies the head of a transactional path that can be used to define a business service abstraction. In this embodiment, the business service includes higher-level components, such as applications 115, and may not include complete application component dependency information. In a real-time execution environment, interactions among application-tier components can be examined, but it may not be possible for the multitier topology map 50 to include application component dependencies. That is, the multitier topology map 50 inventories application components but, depending on the particular environment, may not be able to examine further the application component dependencies.

In another embodiment of the present invention, a descriptor is used in conjunction with the service access point to define the business service. In this embodiment, the descriptor includes dependencies information for the application components 125. One or more descriptors can be used to create application component dependencies for the inventory of application components 125 in the multitier topology map 50. Further details of creating and obtaining descriptors are described below.

Referring again to FIG. 4, in step 410, a business service object is built. In one embodiment of the present invention, the business service is constructed using the service access point and dependency information obtained from the multitier topology map 50. Using the service access point as the head of a transactional path, the dependencies along the transactional path can specify the membership of the business service. That is, a business service object can be created to group the component dependencies of the transactional path. Using dependency information from the multitier topology map 50, the membership of the business service object is resolved by following the chain of dependencies from the service access point. As described above, however, the membership of the business service object may not be resolved at a granularity that includes application components 125.

In an environment where a descriptor is available, the application component dependencies described in the descriptor can be used to create the business service object at a granularity that includes application components 125. In this case, the business service is built 410 using the descriptor and the service access point. The descriptor includes dependency information for the application components 125. The service access point specifies the head of a transactional path and the descriptor specifies the membership of the transactional path. In embodiments of the present invention described herein, the descriptor includes application component dependencies, however, one skilled in the art will recognize that the descriptor can be used to define explicitly relationships or dependencies at any granularity or hierarchical level within the multitier topology map 50.

After the business service object has been built, it can be integrated 415 into the multitier topology map 50. In one embodiment of the present invention, the business service object is stored as a first-class object in the multitier topology map 50. For example, referring to FIG. 1, the business service object is stored in the portion of the multitier topology map 50 corresponding to business services 135. One skilled in the art will appreciate, however, that the architecture of the multitier topology map 50 allows for flexibility when storing the business service. For example, the grouping or mapping of components to a business service or business service can be stored directly in the application dependencies 140.

Figure 5:
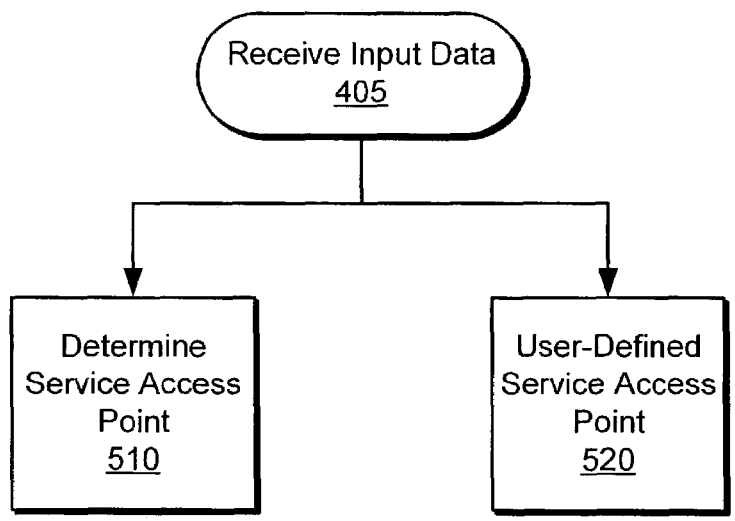
FIG. 5 is a flowchart illustrating further details of receiving input data according to one embodiment of the present invention.

FIG. 5 is a flowchart illustrating further details of receiving input data 405 according to one embodiment of the present invention. In the present invention, there can be multiple methods of receiving input data 405. One method is determining a service access point 510. This is an automated or programmatic approach of identifying service access points using the multitier topology map 50 or analysis of the run-time compute infrastructure. Further details of determining a service access point 510 are described below.

Another method for receiving input data 405 is a user-defined service access point 520. A user can specify, for example, a URL that indicates the service access point. One skilled in the art will recognize that the user-defined service access point 520 can be input in a variety of ways. For example, an interactive or non-interactive user interface can be used. The user-defined service access point 520 can be specified before, during, or after a run-time analysis of the multitier compute infrastructure. In the case where the user-defined service access point 520 is specified before generation of the multitier topology map 50, the user can also specify at least one component that falls within the transactional chain. For example, a user can identify http://ordering.company.com as a service access point and an ordering servlet (e.g., a Java Server Page (JSP)) component as the head of the transactional chain. Before run-time mapping occurs, the user need not and probably does not know on which web server or compute hardware in the multitier compute infrastructure the ordering servlet will execute. When the business service object is built 410, the run-time topology can be retrieved from the multitier topology map 50 to resolve which components are related to the ordering JSP and which objects are inherently part of the JSP component.

Figure 6:
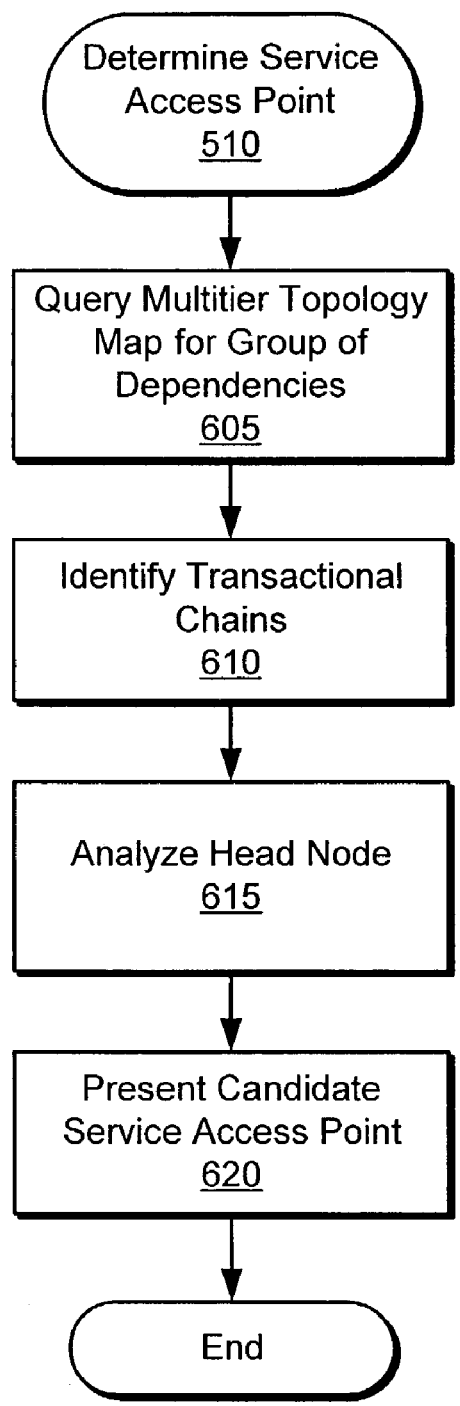
FIG. 6 is a flowchart illustrating a method for determining a service access point according to one embodiment of the present invention.

FIG. 6 is a flowchart illustrating a method for determining a service access point 510 according to one embodiment of the present invention. The illustrated method begins with querying 605 the multitier topology map 50 for a group of dependencies. For example, application components 125 contain an inventory of application components and their dependencies. One skilled in the art will appreciate that other parts of the multitier topology map 50 may also include relationships or dependencies among components.

The transactional chains are identified 610 from the group of application component dependencies. A conventional path analysis algorithm can be used to process the group of dependencies and generate a list of paths. The application components at the ends of the paths (i.e., the head and the tail node) are analyzed 615 for application or compute tier dependencies, for example. These dependencies may indicate that the component is a service access point. For example, a web server that is dependent upon an application component that is at the head of a transactional path may indicate a service access point. In one example implementation, a servlet is used to respond to a URL request and can call other servlets, JavaServer Pages (JSP), or enterprise JavaBeans (EJBs). Accordingly, the servlet can identify the head of a directional transaction chain. Several transactional chains may be identified 610 and analyzed 615. The analysis 615 produces a set of candidate service access points.

The candidate service access points can be presented 620 to a user for selection and identification. Therefore, step 620 may be similar to the user-defined service access point 520 described above. In step 620, however, the present invention has identified a set of candidate service access points using data obtained from the multitier topology map 50 or real-time analysis of the multitier compute infrastructure. In one approach, the system can generate a graphical display of a candidate service access point and its corresponding transactional chain or dependency path (see, e.g., FIG. 3B). The user can then name the business service. For example, the user may determine that the candidate service access point is referring to an order processing business service. After the user has correlated the candidate service access point to a real-word business service, the process returns to step 410 where the business service object is built.

One skilled in the art will appreciate that the method illustrated in FIG. 6 can also be implemented without requiring user input. In one case, the set of candidate service access points may have a single member. In this case, user selection or confirmation that the identified transactional path represents a business service. The system can select a generic name, such as business service_1, and proceed to build the business service object. Alternatively, the system could infer an appropriate name for the business service given data obtained from the multitier topology map 50. In another approach, the system can select a name for each of the candidate service access points and corresponding transactional paths identified 610 and automatically build business service objects for each.

Figure 7:
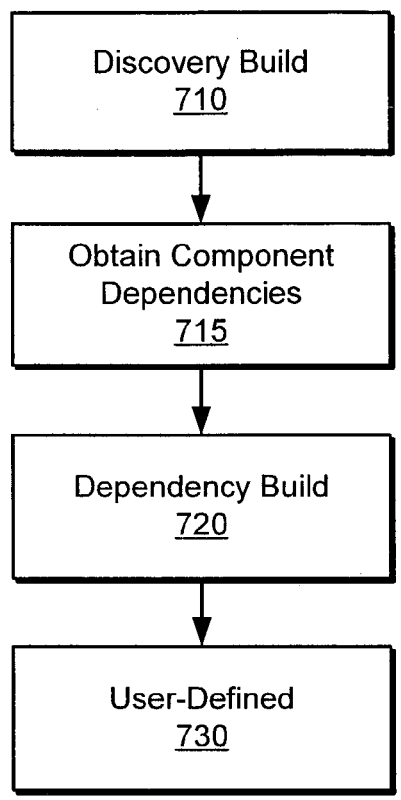
FIG. 7 is a flowchart illustrating one method of building a multitier topology map in accordance with the present invention.

FIG. 7 is a flowchart illustrating one method for building a multitier topology map 50 in accordance with the present invention. In step 710, the system generates an initial inventory of components in the multitier compute infrastructure and also discovers lower-level relationships between the components. Referring to FIG. 1, the inventory typically will identify most of the network components 105, compute components 110 and application components 125, as these components are easily discoverable. They are more physical and less abstract in nature, as compared to logical applications 120 and business services 135. In addition, many of these network, compute, and application components have interfaces that allow for their automatic discovery. Moreover, an application component can provide metadata about its dependencies through an interface. A descriptor for providing such metadata is described below in further detail.

The relationships discovered also tend to by more physical and lower level in nature, for example physical containment of components (e.g., Apache web server X resides on physical server Y located at IP address Z). At the conclusion of step 710, the multitier topology map 50 includes the majority of building block components. Additional components identified in subsequent steps tend to be higher level and constructed from the basic components discovered in step 710. The majority of physical relationships are also discovered in step 710. As a result, the remaining steps 715, 720, 730 operate primarily at the application-level. For example, new components typically are defined in terms of previously existing application-level components but inherit any dependencies on network and compute components.

In step 715, component dependencies are obtained. In one approach, the application components 125 that were discovered in step 710 are queried for a descriptor. The descriptor can be accessed through a component interface and provides metadata that describes how an application component is related to other application components to form a business service. In addition, a transactional analysis of component dataflow at runtime can be performed to determine component dependencies.

The present invention uses the information gathered in steps 710, 715 to generate higher-level relationships. In the dependency build 720, relationships that are not apparent from a physical inspection of the multitier compute infrastructure can be deduced. Further, dependency data from the component descriptors obtained in step 715 can be incorporated in the multitier topology map 50 for subsequent processing in, for example, step 410 described above. One skilled in the art will recognize, however, that some functionally can be shared among step 410 and step 715 in terms of resolving the application component dependency information and building the business service object. For example, in one implementation, dependency build 720 parses the metadata from the descriptor into the multitier topology map 50. In another implementation, dependency build 720 resolves each of the dependency relationships described in the descriptor. That is, dependency information is incorporated into the multitier topology map 50 at the application component level. In this case, the step of building the business service object 410 uses this dependency information to construct a business service object.

In step 730, the user can manually define higher-level components and relationships, for example business application packages and business services. In addition to the automated methods described herein, a business service can be manually defined through an interactive or non-interactive user interface. The user can select components for inclusion into the business service object. In one approach, graphical tools permit the user to define these higher-level components and relationships. For example, the user could select a name for a business service and then drag and drop components into the business service icon to indicate that the business service depends on those components. Components can be grouped and related to one another in a way that better reflects the enterprise's business rather than the physical layout of the multitier compute infrastructure.

Figure 8:
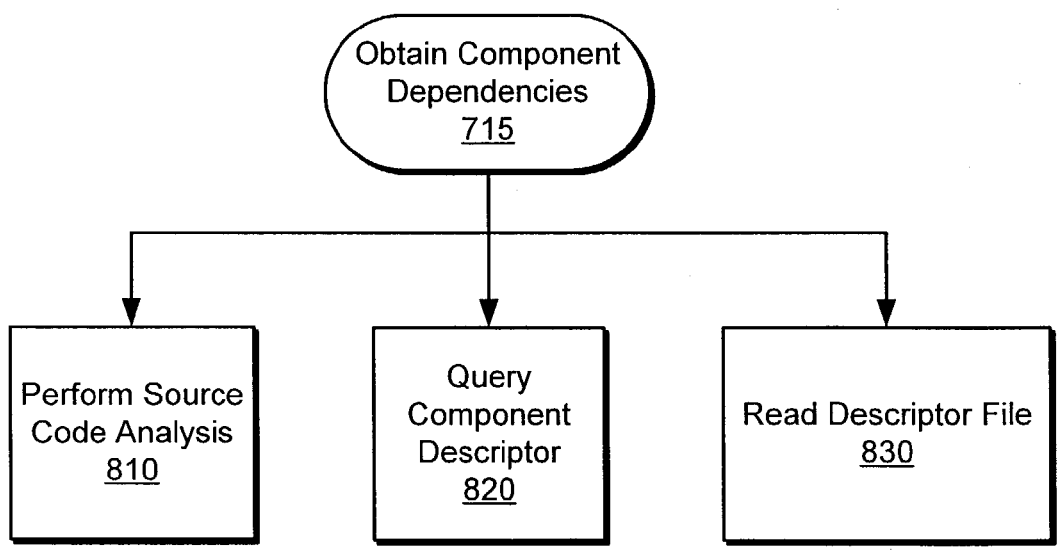
FIG. 8 is a flowchart illustrating further details of obtaining a component descriptor according to one embodiment of the present invention.

FIG. 8 is a flowchart illustrating further exemplary details of obtaining a component descriptor according to one embodiment of the present invention. Three distinct ways of obtaining a descriptor are illustrated. In one approach, a descriptor can be generated by performing source code analysis 810. Although the apparatus and methods described herein generally operate in a run-time environment with executing computer processes, source code may be available for online or offline analysis. Analysis of the source code for a business application package, such as ordering, can reveal how the application components work together and are dependent upon each other to accomplish an ordering business service. Further details of source code analysis 810 are described below and with reference to FIG. 9.

In another approach, the descriptor can be queried from the application component 820. In this case, a descriptor that indicates the dependencies for the application component is incorporated into an interface that is packaged with the application component. More specifically, the application components 125 present in the multitier topology map 50 are queried through a messaging interface for a descriptor. If a descriptor is returned from a particular component, it can be used to resolve that component's dependencies. If a descriptor is not returned from a component, other methods such as source code analysis or manual definition can be used to obtain the dependency information.

In a further approach, a descriptor can be read from a file 830. The file can contain descriptors for a single component or a plurality of components. The file can be in extensible markup language (XML) format or another format. Reading from a file 830 is one embodiment of a non-interactive user-defined process for grouping application components into business services. One skilled in the art will recognize, however, that the contents of the file do not have to be manually defined. Source code analysis 810, for example, can programmatically produce a file containing application component dependency information. This may be advantageous when offline processing of source code is performed. That is, in some cases it may be undesirable to recompile the application with descriptors incorporated into the application components. However, offline analysis of the source code can generate a file containing descriptors than can be read and processed to define the business services.

Although the steps of FIG. 8 are distinctly described, one skilled in the art will appreciate, however, that the methods are not necessarily mutually exclusive. Depending on the particular distributed computing environment, a combination of methods can be appropriate for obtaining dependency information for each of the application components 125 described in the multitier topology map 50 or otherwise identified in the multitier compute infrastructure.

Figure 9:
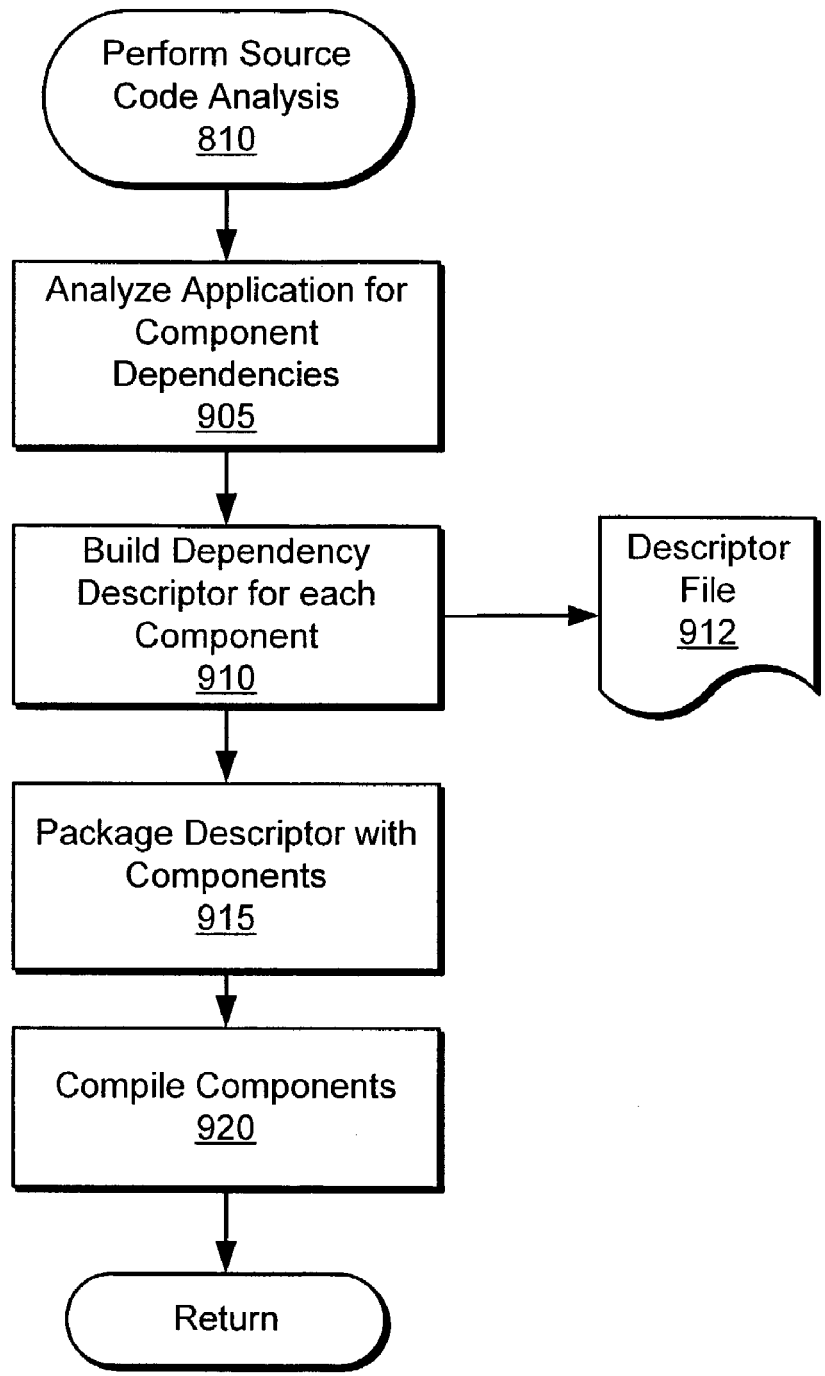
FIG. 9 is a flowchart illustrating a method for performing source code analysis and descriptor integration according to one embodiment of the present invention.

FIG. 9 is a flowchart illustrating a method for performing source code analysis and descriptor integration according to one embodiment of the present invention. In one embodiment of the present invention, a descriptor can be packaged with each application component. A compiler or other development tool can be used to create the descriptor and perform the packaging of the descriptor into the components during compilation. Additionally, a linker could incorporate or embed the descriptor during execution.

In one approach, when the multitier topology map 50 is being populated, the interface for the component is queried for the descriptor. The descriptor provides dependency information that is used in defining a business service. One skilled in the art will appreciate, however, that the application component can be asynchronously queried for its descriptor. That is, the application component can respond to a request for its descriptor during a build or refresh of the multitier topology map 50 or at another time.

The illustrated method begins with analyzing the source code of the application for component dependencies 905. A compiler can map the data flow or messages exchanged between objects or components to determine how the components interact. For example, the compiler can determine that a check_order_status component sends messages to and receives data from a database access component. These interactions can be captured in a data structure for each component or a set of components.

Next, a descriptor is built for each component 910 using the data structure. The descriptor can be output to a file 912. To generate the file output, the compiler can convert the data structure or object into XML or another format. As described above, a descriptor file can be used to provide component dependency information when, for example, the descriptor is not packaged with the application component. Additionally, the data structure or descriptor can be integrated into an interface method to be packaged with the application component.

In step 915, the data structure or descriptor is packaged with the application component. A template can be used to generate an interface module or method that incorporates the data structure with dependency information. In one embodiment, the interface method generates the descriptor in a particular format when queried. For example, the internal data structure or object can contain raw dependency information that is transformed into an XML format message that is sent to the requesting object or process. Extensible markup language is advantageous because of its structured format and interoperability among many computing devices or systems. One skilled in the art will appreciate that other message formats or protocols can also be used to exchange the dependency information.

After the descriptor is packaged into the application component 915, the application component can be compiled 920 with the descriptor and interface method. Depending on the architecture or programming language, only a portion of the application component may need to be recompiled. In one approach, the descriptor can be compiled as a separate module and linked at run-time with the precompiled application. Although file packaging can be dependent on the software technology, one skilled in the art will appreciate that the descriptor can be integrated in other software technologies.

Figure 10:
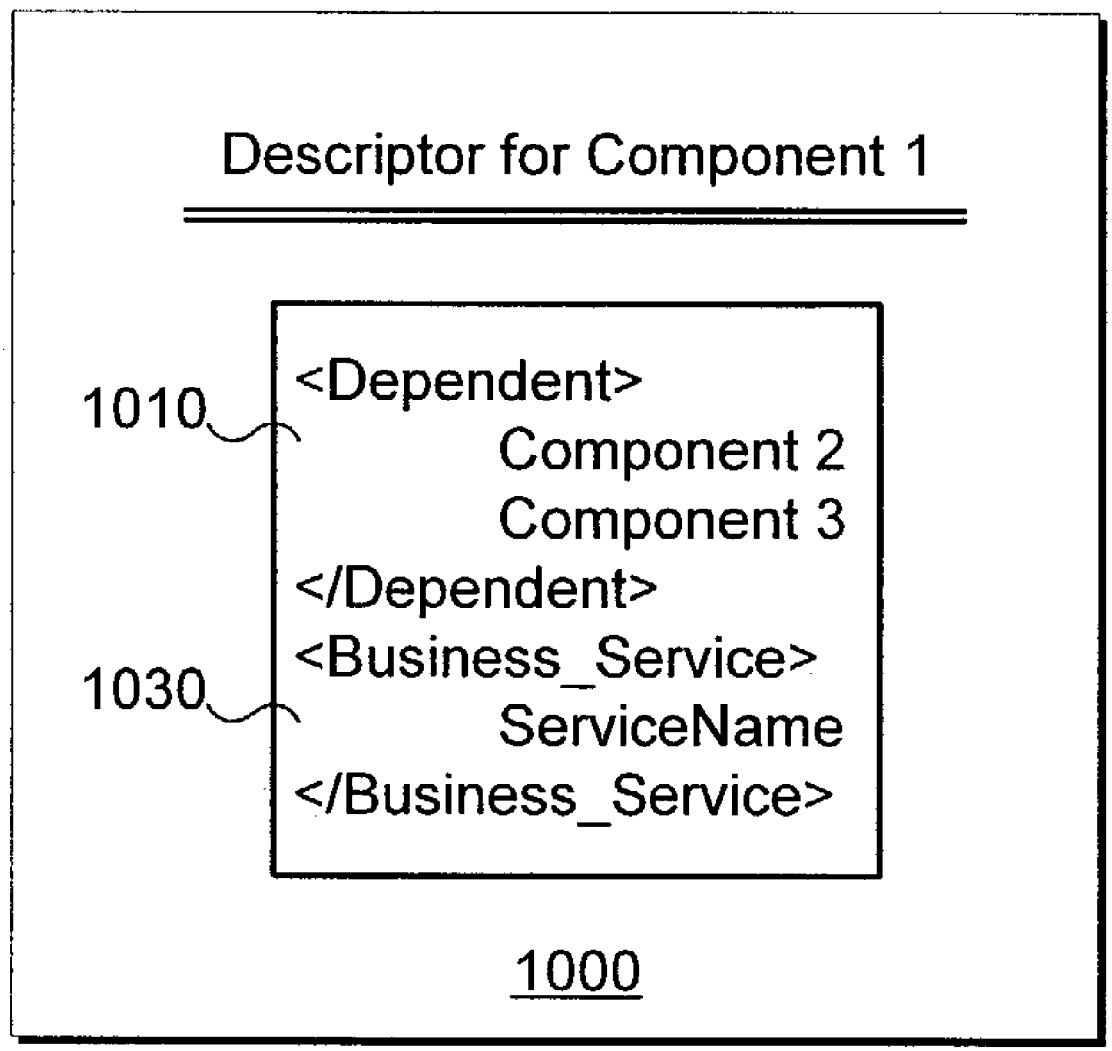
FIG. 10 is an illustration of an exemplary descriptor for a component according to one embodiment of the present invention.

FIG. 10 is an illustration of an exemplary descriptor for a component according to one embodiment of the present invention. A descriptor 1000 for an exemplary component "Component 1" is illustrated. The descriptor 1000 includes a dependency tag 1010 and a business service tag 1030. The components that "Component 1" depends upon are specified within the dependency tag 1010. In the illustrated example, "Component 1" is dependent upon "Component 2" and "Component 3." The business service tag 1030 can be used to describe the business service to which this component belongs. In the illustrated example, the "Component 1" is a member of the business service "ServiceName." When the business service object is built 410, the descriptor 1000 can be examined for component dependencies. The component names specified in the descriptor 1000 are correlated to the application components 125 in the multitier topology map 50.

Although the descriptor 1000 identifies dependencies and business service membership for a single application component, the descriptor 1000 can include dependencies for multiple components. A tagged structure, such as XML, can be used to structure the data so that a single descriptor can provide dependency information for a plurality of application components.

As described above, the descriptor 1000 can identify the application component dependencies for creating the business service object at a granularity that includes application components 125. The business service is built 410 using the descriptor and the service access point. The service access point specifies the head of a transactional path and the descriptor specifies the membership of the transactional path. In FIG. 10, the descriptor includes application component dependencies, however, one skilled in the art will recognize that the descriptor can be used to define explicitly relationships or dependencies at any granularity or hierarchical level within the multitier topology map 50.

Figure 11:
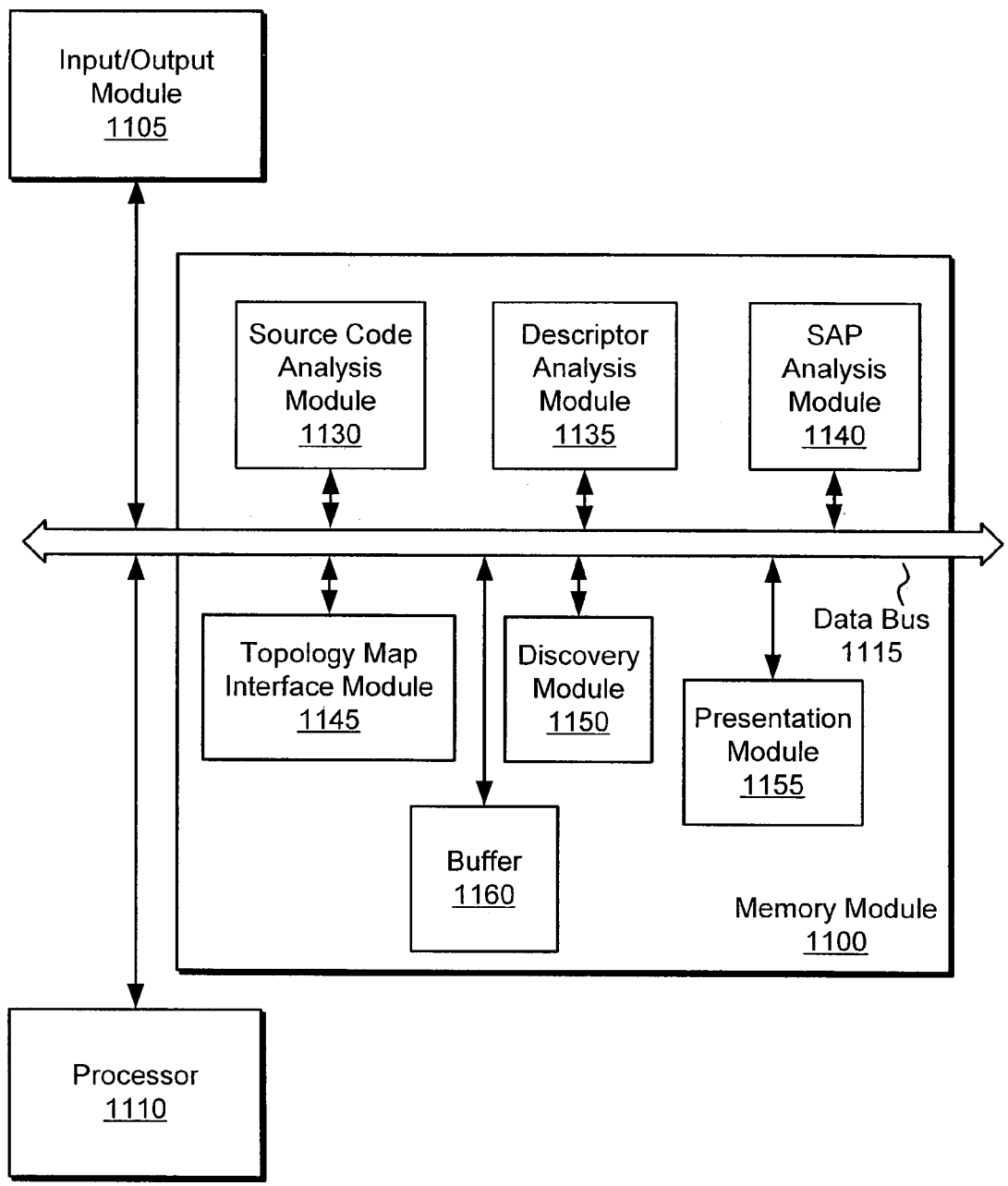
FIG. 11 is a functional block diagram of computing device according to one embodiment of the present invention.

FIG. 11 is a functional block diagram of computing device according to one embodiment of the present invention. The illustrated computing device includes memory module 1100, input/output module 1105, and processor 1110, each illustrated coupled to data bus 1115. Alternatively, one or more of the modules can be directly coupled together. The memory module 1100 can include software modules of executable program instructions. The data bus 1115 provides an interface to other functional units, for example, the input/output module 1105 or the processor 1110. In the embodiment illustrated in FIG. 11, the memory module 1100 includes a source code analysis module 1130, a descriptor analysis module 1135, a service access point analysis module 1140, a topology map interface module 1145, a discovery module 1150, a presentation module 1155, and a buffer 1160, each of which is coupled to the data bus 1115.

Program instructions included in the illustrated modules generally implement the processes described above and with reference to FIGS. 4–9. For example, the source code analysis module 1130 includes program instructions for implementing the steps of FIG. 9, such as analyzing an application for component dependencies. The descriptor analysis module 1135 includes program instructions for defining a business service. The service access point analysis module 1140 includes program instructions for determining a service access point from the multitier topology map 50. The topology map interface module 1145 includes program instructions for providing input/output services to other modules to retrieve information from or to store information to the multitier topology map 50. The discovery module 1150 includes program instructions for populating the multitier topology map 50. The discovery module 1150 can further query discovered application components 125 for a descriptor 1000. The presentation module 1155 includes program instructions for generating a user interface and for generating service level views, such as illustrated in FIG. 3B. Each of the program modules can use buffer 1160 for data storage. In one embodiment of the present invention, the topology map interface module places objects retrieved from the multitier topology map in the buffer 1160 and gathers objects from buffer 1160 for storage to the multitier topology map 50.

Having described embodiments of a service descriptor for a multitier compute infrastructure (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A method for defining a business service for a multitier compute infrastructure, the method comprising:
   receiving input data for describing at least a service access point of the business service by:
      querying a multitier topology map for a dependency chain;
      determining a head node of the dependency chain; and
      analyzing the head node for the service access point, wherein the business service comprises components across the multitier compute infrastructure, and wherein the service access point comprises a starting point of a chain of the component dependencies of the business service;
   obtaining a descriptor for a first component of the business service, the descriptor for describing a relationship between the first component and a second component of the business service;
   building a business service object representing the business service using at least the service access point and the descriptor; and
   integrating the business service object into a multitier topology map.

2. The method of claim 1, wherein the descriptor further describes a relationship between the first component and a plurality of components.

3. The method of claim 1, wherein the descriptor includes a tagged structure for describing dependency information about a plurality of application components.

4. The method of claim 1, wherein the descriptor is configured to define a grouping of components that implement a business process.

5. The method of claim 1, wherein the obtaining further comprises:
   reading the descriptor from a file.

6. The method of claim 1, wherein the obtaining further comprises:
   reading the descriptor from an application package.

7. The method of claim 1 wherein the building further comprises:
   associating the service access point with at least one component from the multitier topology map.

8. The method of claim 1, wherein the obtaining further comprises:

querying an interface of the first component for the descriptor.

9. The method of claim 8 further comprising:
repeating the querying for a plurality of components.

10. The method of claim 1, further comprising:
repeating the querying, determining, and analyzing for a plurality of dependency chains to generate a set of candidate service access points; and
selecting the service access point from the set of candidate service access points.

11. The method of claim 1, wherein a servlet identifies the head node.

12. The method of claim 1 wherein the receiving further comprises:
analyzing application source code for at least one component relationship; and
generating a descriptor for describing the at least one component relationship.

13. The method of claim 12 further comprising:
writing a file to a storage medium, the file including the descriptor.

14. A system for defining a business service for a multitier compute infrastructure, comprising:
a processor;
a multitier topology map; and
a memory including modules having instructions executed by the processor to perform operations, the operations comprising:
receiving input data for describing at least a service access point of the business service by:
querying the multitier topology map for a dependency chain;
determining a head node of the dependency chain; and
analyzing the head node for the service access point, wherein the business service comprises components across the multitier compute infrastructure, and wherein the service access point comprises a starting point of a chain of the component dependencies of the business service;
obtaining a descriptor for a first component of the business service, the descriptor for describing a relationship between the first component and a second component of the business service;
building a business service object representing the business service using at least the service access point and the descriptor; and
integrating the business service object into the multitier topology map.

15. The system of claim 14, wherein the descriptor is configured to define a grouping of components that implement a business process.

16. The system of claim 14, wherein the building further comprises:
associating the service access point with at least one component from the multitier topology map.

17. The system of claim 14, wherein the receiving further comprises:
analyzing application source code for at least one component relationship; and
generating a descriptor for describing the at least one component relationship.

18. A computer readable medium including program modules executed by a processor to perform operations to define a business service for a multitier compute infrastructure, wherein the operations comprise:
receiving input data for describing at least a service access point of the business service by:
querying a multitier topology map for a dependency chain;
determining a head node of the dependency chain; and
analyzing the head node for the service access point, wherein the business service comprises components across the multitier compute infrastructure, and wherein the service access point comprises a starting point of a chain of the component dependencies of the business service;
obtaining a descriptor for a first component of the business service, the descriptor for describing a relationship between the first component and a second component of the business service;
building a business service object representing the business service using at least the service access point and the descriptor; and
integrating the business service object into a multitier topology map.

19. The computer readable medium of claim 18, wherein the descriptor is configured to define a grouping of components that implement a business process.

20. The computer readable medium of claim 18, wherein the building further comprises:
associating the service access point with at least one component from the multitier topology map.

21. The computer readable medium of claim 18, wherein the receiving further comprises:
analyzing application source code for at least one component relationship; and
generating a descriptor for describing the at least one component relationship.

* * * * *